(12) United States Patent
Lin

(10) Patent No.: US 7,656,862 B2
(45) Date of Patent: Feb. 2, 2010

(54) METHODS, SYSTEMS, AND DEVICES FOR PROVIDING VOICE-CALL SERVICES RESPONSIVE TO A DIALED SEQUENCE

(75) Inventor: Shiejye Geoffrey Lin, Duluth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 595 days.

(21) Appl. No.: 11/214,446

(22) Filed: Aug. 29, 2005

(65) Prior Publication Data

US 2007/0047518 A1 Mar. 1, 2007

(51) Int. Cl.
H04L 12/66 (2006.01)
(52) U.S. Cl. ...................... 370/352; 370/356
(58) Field of Classification Search ............. 370/352, 370/278, 356
See application file for complete search history.

(56) References Cited

U.S. PATENT DOCUMENTS 6,259,691 B1 * 7/2001 Naudus ...................... 370/352
6,614,781 B1 * 9/2003 Elliott et al. ................ 370/352
6,954,454 B1 * 10/2005 Schuster et al. ............. 370/352
2004/0042444 A1 * 3/2004 Edmon et al. ............... 370/352

* cited by examiner

Primary Examiner—Chirag G Shah
Assistant Examiner—Minh-Trang Nguyen
(74) Attorney, Agent, or Firm—Myers Bigel Sibley & Sajovec, P.A.

(57) ABSTRACT

A connection is established in a communications network responsive to receiving a Dual Tone Multi-Frequency (DTMF) signal at a port having an assigned sequence associated therewith. A dialed sequence corresponding to the received DTMF signal is identified. If the dialed sequence is associated with a request for a specified service, first and second fields of a packet-switched signaling protocol message are populated with the assigned sequence associated with the port. The populated packet-switched signaling protocol message is transmitted over a packet-switched network to request the specified service, and a connection is established to provide the specified service through the port. Related systems and devices are also discussed.

19 Claims, 4 Drawing Sheets

METHODS, SYSTEMS, AND DEVICES FOR PROVIDING VOICE-CALL SERVICES RESPONSIVE TO A DIALED SEQUENCE

FIELD OF THE INVENTION

The present invention relates to communications networks, and, more particularly, to providing services over a communications network.

BACKGROUND OF THE INVENTION

Communications networks are widely used for nationwide and worldwide communication of voice, multimedia and/or data. As used herein, communications networks include public communications networks, such as the Public-Switched Telephone Network (PSTN), terrestrial and/or satellite cellular networks, and/or the Internet.

The Internet is a decentralized network of computers that can communicate with one another via Internet Protocol (IP). The Internet is a packet-switched network, where data may be broken into bits (packets) such that each packet may be transmitted separately across various networks and then reassembled before delivery. Packet-switching may be highly efficient, as many packets can use the same transmission path, and may also be resilient, because packet-switching protocols may dynamically route around congested or downed network sectors. In contrast, the PSTN is a circuit-switched network, where all data may go directly to a call recipient in the correct order across a dedicated circuit. The dedicated circuit may be utilized exclusively until the call ends.

A gateway may be used to provide interoperability between circuit-switched networks (such as the PSTN) and packet-switched networks (such as the Internet). More generally, a gateway may be a network node that is equipped for interfacing with other networks that use different protocols. The gateway may include protocol translators, signal translators, and/or access equipment as necessary to provide system interoperability. For example, an access multiplexer may be employed as a gateway device. An access multiplexer is a network device that receives signals from multiple customer lines and puts the signals on one or more high-speed backbone lines using multiplexing techniques.

Voice-Over-Internet Protocol (VoIP) is a packet-based voice service that is increasingly being provided by telecommunications service providers. In VoIP, voice communications may be digitized and transmitted in small data packets to the intended recipients over a packet-switched network. Accordingly, in order to implement VoIP services, many telecommunications service providers may wish to replace traditional Class-5 switches in existing telephone networks with access multiplexers including gateway functionality. More particularly, an access multiplexer with gateway functionality may be used to provide VoIP service to customers by connecting them to VoIP feature servers available in the packet-switched network. However, it may be difficult to implement such a transition without impact on existing customer services.

For example, *98 service is an existing advanced intelligent network (AIN) service which allows customers to call into their voicemail from their home phone number directly by dialing *98. However, not all VoIP feature servers may be configured to support *98 voicemail service. As such, in order for existing customers to continue to access voicemail by dialing *98, VoIP feature server vendors may be required to develop a custom *98 service, which may be costly for telephone service providers. Alternatively, as most VoIP feature servers may support *XX feature code dialing and/or *XX speed dialing, telephone service providers may provision *98 using the *XX feature to forward calls to a customer's voicemail portal. However, in such a solution, a customer may be able to change the settings associated with *98 on the VoIP feature servers via their telephone user interface. Consequently, a customer may inadvertently deactivate *98 service. Also, such provisioning may limit the full feature capability offered by *XX feature code dialing and/or *XX speed dialing provided by the VoIP feature servers.

SUMMARY OF THE INVENTION

According to some embodiments of the present invention, a method of establishing a connection in a communications network may include receiving a Dual Tone Multi-Frequency (DTMF) signal at a port having an assigned sequence associated therewith. A dialed sequence corresponding to the received DTMF signal may be identified. If the dialed sequence is associated with a request for a specified service, first and second fields of a packet-switched signaling protocol message may be populated with the assigned sequence associated with the port. The populated packet-switched signaling protocol message may be transmitted over a packet-switched network to request the specified service, and a connection may be established to provide the specified service through the port.

In some embodiments, if the dialed sequence is not associated with a request for a specified service, the first field may be populated with the assigned sequence, and the second field may be populated with the dialed sequence.

In other embodiments, the dialed sequence may be a shorter sequence than the assigned sequence associated with the port. For example, the dialed sequence may be a two- or three-character sequence, while the assigned sequence may be a seven- or ten-character sequence.

In some embodiments, the first and second fields of the packet-switched signaling protocol message may be an origination field and a destination field. As such, the origination field and the destination field may be populated with the assigned sequence associated with the port.

In other embodiments, the specified service may be a voicemail service, and the packet-switched signaling protocol message may be a Session Initiation Protocol (SIP) message.

In some embodiments, the DTMF signal may be received over a public telephone network at a port of a Public-Switched Telephone Network (PSTN)/Internet Protocol (IP) gateway device. As such, the dialed sequence may be identified and the first and second fields of the packet-switched signaling protocol message may be populated at the PSTN/IP gateway device. For example, the PSTN/IP gateway device may be a Digital Subscriber Line Access Multiplexer (DSLAM).

In other embodiments, the populated packet-switched signaling protocol message may be transmitted to a server configured to provide the specified service, and a connection may be established between the port and the server. For example, the populated packet-switched signaling protocol message may be transmitted to an application server. The application server may be configured to transmit a request to a media server configured to provide the specified service. As such, a connection may be established between the port and the media server.

According to further embodiments of the present invention, a network access device may include a port having an assigned sequence associated therewith and configured to receive a Dual Tone Multi-Frequency (DTMF) signal. A controller may be coupled to the port. The controller may be configured to identify a dialed sequence corresponding to the received DTMF signal. If the dialed sequence is associated with a request for a specified service, the controller may be configured to populate first and second fields of a packet-switched signaling protocol message with the assigned sequence associated with the port. A transmitter may be coupled to the controller and may be configured to transmit the populated packet-switched signaling protocol message over a packet-switched network to request the specified service.

In some embodiments, if the dialed sequence is not associated with a request for a specified service, the controller may be further configured to populate the first field with the assigned sequence and populate the second field with the dialed sequence.

In other embodiments, the dialed sequence may be a shorter sequence than the assigned sequence associated with the port.

In some embodiments, the first and second fields of the packet-switched signaling protocol message may be an origination field and a destination field. For example, the packet-switched signaling protocol message may be a Session Initiation Protocol (SIP) message. As such, the controller may be configured to populate the origination field and the destination field of the packet-switched signaling protocol message with the assigned sequence associated with the port.

In other embodiments, the specified service may be a voicemail service.

In some embodiments, the port may be configured to receive the DTMF signal over a public telephone network. The controller may be configured to provide an interface between the public telephone network and the packet-switched network. For example, the network access device may be a Digital Subscriber Line Access Multiplexer (DSLAM) configured to provide a Public-Switched Telephone Network (PSTN)/Internet Protocol (IP) gateway.

In some embodiments, the transmitter may be configured to transmit the populated packet-switched signaling protocol message to a server configured to provide the specified service. The controller may be configured to establish a connection between the port and the server. For example, the transmitter may be configured to transmit the populated packet-switched signaling protocol message to an application server. The application server may be configured to transmit a request to a media server configured to provide the specified service. As such, the controller may be configured to establish a connection between the port and the media server.

According to still further embodiments of the present invention, a method of establishing a connection between a Public-Switched Telephone Network (PSTN) and an Internet Protocol (IP) network may include identifying a dialed sequence corresponding to a Dual Tone Multi-Frequency (DTMF) signal received at a port of a PSTN/IP gateway device. The port may have a first sequence associated therewith. If the dialed sequence is associated with a specified service, a second sequence that is different from the dialed sequence may be associated with the identified dialed sequence at the PSTN/IP gateway device. A packet-switched signaling protocol message including the first sequence and the second sequence may be transmitted from the PSTN/IP gateway device to a server over a packet-switched network to request the specified service.

According to other embodiments of the present invention, a system for accessing services in a communications network may include an access multiplexer configured to identify a dialed sequence corresponding to a Dual Tone Multi-Frequency (DTMF) signal received at a port thereof. The access multiplexer may be configured to populate a packet-switched signaling protocol message with a first sequence associated with the port and a second sequence associated with the dialed sequence that is different from the dialed sequence. The access multiplexer may be further configured to transmit the packet-switched signaling protocol message over a packet-switched network to request a specified service associated with the dialed sequence. For example, the first sequence and the second sequence may be a same sequence, and the specified service may be a voicemail service.

Other methods, systems, devices, and/or computer program products according to other embodiments of the invention will be or become apparent to one with skill in the art upon review of the following drawings and detailed description. It is intended that all such additional methods, systems, devices, and/or computer program products be included within this description, be within the scope of the present invention, and be protected by the accompanying claims.

DETAILED DESCRIPTION OF EMBODIMENTS OF THE INVENTION

Figure 1:
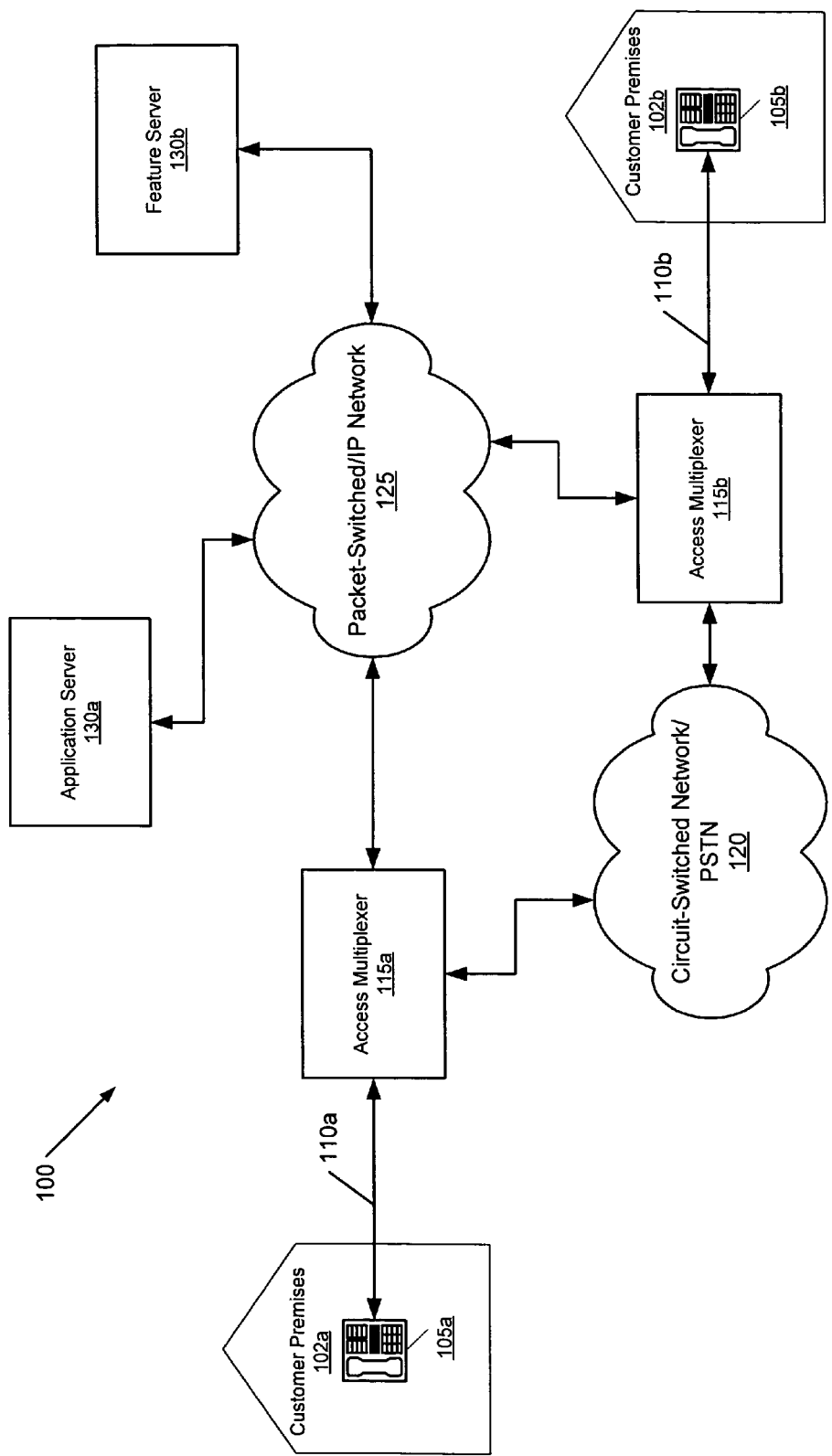
FIG. 1 is a block diagram illustrating systems and methods for providing voice-call services responsive to a dialed sequence according to some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first multimedia device could be termed a second multimedia device, and, similarly, a second multimedia device could be termed a first multimedia device without departing from the teachings of the disclosure.

The present invention may be embodied as systems, methods, and/or computer program products. Accordingly, the present invention may be embodied in hardware and/or hardware in combination with software (including firmware, resident software, micro-code, etc.). Furthermore, the present invention may take the form of a computer program product on a computer-readable storage medium having computer-usable or computer-readable program code embodied in the computer-readable storage medium for use by or in connection with an instruction execution system. In the context of this document, a computer-readable storage medium may be any medium that can contain and/or store the program for use by or in connection with the instruction execution system, apparatus, or device.

The computer-usable or computer-readable medium may be, for example but not limited to, a system, apparatus, or device. More specific examples (a non-exhaustive list) of the computer-readable storage medium would include the following: a portable computer diskette, a random access memory (RAM), a read-only memory (ROM), an erasable programmable read-only memory (EPROM or Flash memory), and a portable compact disc read-only memory (CD-ROM).

The present invention is described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating systems and methods for providing voice-call services responsive to a dialed sequence according to some embodiments of the present invention. Referring now to FIG. 1, a system 100 includes customer premises equipment (CPE) 105a located at customer premises 102a and coupled to an access multiplexer 115a via a local loop 110a. The access multiplexer 115a is configured to provide an interface between the customer premises equipment 105a and a circuit-switched network 120 and/or a packet-switched network 125. In other words, the access multiplexer 115a may be configured to provide gateway functionality between the circuit-switched and packet-switched networks 120 and 125. For example, the circuit-switched network 120 may be a public telephone network, such as the Public-Switched Telephone Network (PSTN), and the packet-switched network 125 may be an Internet Protocol (IP) network, such as the Internet. The packet-switched network 125 may also include an application server 130a and/or a media server 130b connected thereto. An access multiplexer 115b is also connected to the packet-switched network 125 and/or the circuit-switched network 120, and provides an interface between the networks 120 and 125 and customer premises equipment 105b (located at customer premises 102b) via local loop 110b.

As used herein, customer premises 102a and/or 102b may include any location where customer premises equipment 105a and/or 105b is installed. For example, the customer premises 102a and/or 102b may be a house, an apartment, an office, or other location. The customer premises equipment 105a and/or 105b may include any voice and/or data communications device, for example, a conventional telephone, a Voice-Over-Internet-Protocol (VoIP) telephone, a conventional telephone coupled to a VoIP adapter, and/or a computer providing telephony functionality. More generally, the customer premises equipment 105a and/or 105b may refer to any telecommunications equipment residing on a customer site.

The local loop 110a and/or 110b is a connection between the customer premises 102a and/or 102b and a telecommunication service provider's central office or other local terminating point. As such, the local loop 110a or 110b provides a transmission path between the access multiplexers 115a and/or 115b and the customer premises equipment 105a and/or 105b. For example, the local loop 110a and/or 110b may include a wire line connection (such as a twisted pair transmission line), an optical connection (such as a fiber optic cable), and/or a wireless connection to the telecommunication service provider's terminating equipment (i.e., access multiplexers 115a and 115b).

The access multiplexers 115a and/or 115b are network devices at the service provider's central office or other local terminating point that link multiple customer connections to one or more high-speed transmission lines for connection to the circuit-switched network 120 and/or the packet-switched network 125. For example, the access multiplexers 115 and/or 115b may be digital subscriber line access multiplexers (DSLAMs) linking customer premises equipment 105a and/or 105b to the PSTN and Internet. As such, a DSL signal may be received from customer premises equipment 105a at access multiplexer 115a via the local loop 110a over a twisted pair transmission line. An xDSL modem with a POTS (Plain Old Telephone Service) splitter at the access multiplexer 115a may be used to extract voice calls (at lower frequencies) and data (at higher frequencies) from the received DSL signal. Voice calls may then be transmitted to the PSTN, and data may be transmitted to the Internet. The voice and data may respectively pass through the PSTN and the Internet, and may be received at access multiplexer 115b. An xDSL modem at the access multiplexer 115b may combine and transmit the voice and data to customer premises equipment 105b via the local loop 110b.

The access multiplexers 115a and/or 115b may also be configured to provide voice-over-IP (VoIP) services, where voice communications are digitized and transmitted in small data packets over a packet-switched network to the intended recipients. As such, the access multiplexers 115a and/or 115b may act as VoIP line gateways that perform PSTN to IP conversion. More particularly, the access multiplexers 115a and/or 115b may provide a PSTN loop interface (including, for example, rings, dial tone, call waiting tone, caller name and number, etc.) to a wire line customer, and may map the PSTN signalings to VoIP signalings, such as Session Initiation Protocol (SIP) and/or Real-Time Transport Protocol (RTP).

The application server 130a and/or the media server 130b may be feature server computers coupled to the packet-switched network 125 that are dedicated for running certain software applications. For example, the application server 130a and/or the media server 130b may be setup and administered to provide application services, such as voicemail services, to users of the network. More particularly, the application server 130a and/or the media server 130b may be a VoIP feature server configured to provide voicemail service for customer premises equipment 105a and/or 105b. For example, the VoIP Feature Server may be configured to provide voicemail service if a customer dials his own telephone number. In other words, upon receiving a SIP message including the customer's 7- or 10-digit telephone number in both the origination and destination fields, the VoIP feature server may recognize the SIP message as a request for voicemail service, and may map the message to a voicemail portal to provide the voicemail service.

According to some embodiments of the present invention, the access multiplexers 115a and/or 115b may be configured to provide voice-call services responsive to a dialed sequence. More particularly, the access multiplexers 115a and/or 115b may be configured to receive a Dual-Tone Multi-Frequency (DTMF) signal over the local loop 110a and/or 110b at a port thereof. The port may be associated with an assigned sequence and/or string. For example, the assigned sequence may be a 7- or 10-digit phone number corresponding to customer premises equipment that is coupled to the port. The access multiplexers 115a and/or 115b may be configured to identify a dialed sequence corresponding to the received DTMF signal, and recognize whether a specified service is associated with the dialed sequence. If the dialed sequence is associated with a request for a specified service, the access multiplexers 115a and/or 115b may be configured to populate first and second fields of a packet-switched signaling protocol message with the assigned sequence associated with the port and/or with a different sequence associated with the dialed sequence. The access multiplexers 115a and/or 115b may be further configured to transmit the populated packet-switched signaling protocol message over a packet-switched network to request the specified service, and establish a connection to provide the specified service through the port.

However, if the dialed sequence is not associated with a request for specified service, the access multiplexer 115a may be configured to populate a first field of the packet-switched signaling protocol message with the assigned sequence and populate a second field of the packet-switched signaling protocol message with the dialed sequence. As such, a connection between the port of the access multiplexer 115a and a port associated with the dialed sequence may be established, as is conventional in the art.

Operations performed by an access multiplexer and/or other gateway device according to embodiments of the present invention will now be described with reference to FIG. 1. For example, a user at customer premises 102a may dial *98 on customer premises equipment 105a (for example, a conventional touch-tone telephone) to access a voicemail service. Access multiplexer 115a may receive a DTMF signal corresponding to *98 over local loop 110a (for example, a twisted pair transmission line in a public telephone network). More particularly, the DTMF signal may be received at a port of the access multiplexer 115a. A 7- or 10-digit sequence corresponding to a telephone number identifying the customer premises equipment 105a may be associated with the port. The access multiplexer 115a may identify *98 as the dialed sequence, and may recognize that *98 is associated with a request for voicemail service.

As described above, a VoIP feature server, such as media server 130b, may be configured to provide voicemail service responsive to receiving a signaling message including the user's phone number in both the origination and destination fields. Therefore, where the received DTMF signal is recognized as a request for voicemail service, the access multiplexer 115a may populate an origination field and a destination field of a Session-Initiation Protocol (SIP) message with the 7- or 10-digit sequence associated with the port. In other words, rather than populating the destination field of the SIP message with the dialed sequence (as in a conventional VoIP system), the access multiplexer 115a may associate the dialed sequence (here, *98) with the 7- or 10-digit phone number of the customer premises equipment 105a, and may populate the destination field of the SIP message with this phone number. The access multiplexer 115a may also populate the origination field of the SIP message with the assigned sequence associated with the port (here, also the 7- or 10-digit phone number). As such, when the specified service is a voicemail service, the assigned sequence associated with the port may be the same as a sequence associated with the dialed sequence. However, it should be noted that if the dialed sequence is recognized as a request for another service (i.e., other than voicemail), the access multiplexer may populate the origination field of the SIP message with the assigned sequence associated with the port, but may populate the destination field with a different sequence that is associated with the dialed sequence.

The access multiplexer 115a then transmits the SIP message over the packet-switched network 125 to request voicemail service, for example, from the application server 130a and/or the media server 130b. The access multiplexer may thereby establish a connection between the application server 130a and/or the media server 130b and the port coupled to the customer premises equipment 105a to provide the voicemail service. In addition, the *98 feature in the access multiplexer 115a may be activated and/or deactivated by a service provider, should the service provider subsequently decide to support *98 for use with a different feature. Accordingly, users of the customer premises equipment 105a and/or 105b may not alter the provisioning of the *98 service.

Although FIG. 1 illustrates exemplary systems and/or methods for providing voice-call services responsive to a dialed sequence in accordance with some embodiments of the present invention, it will be understood that the present invention is not limited to such a configuration, but is intended to encompass any configuration capable of carrying out the operations described herein. For example, although application server 130a and media server 130b are illustrated as separate elements, it is to be understood that application server 130a and media server 130b may be included in a single server computer, which may be referred to as a feature server. Also, although customer premises equipment 105a and 105b are illustrated as coupled to different access multiplexers 115a and 115b, respectively, the customer premises equipment 105a and 105b may be coupled to a same access multiplexer. Moreover, in VoIP embodiments, the PSTN 120 may be eliminated from the system 100.

Figure 2A:
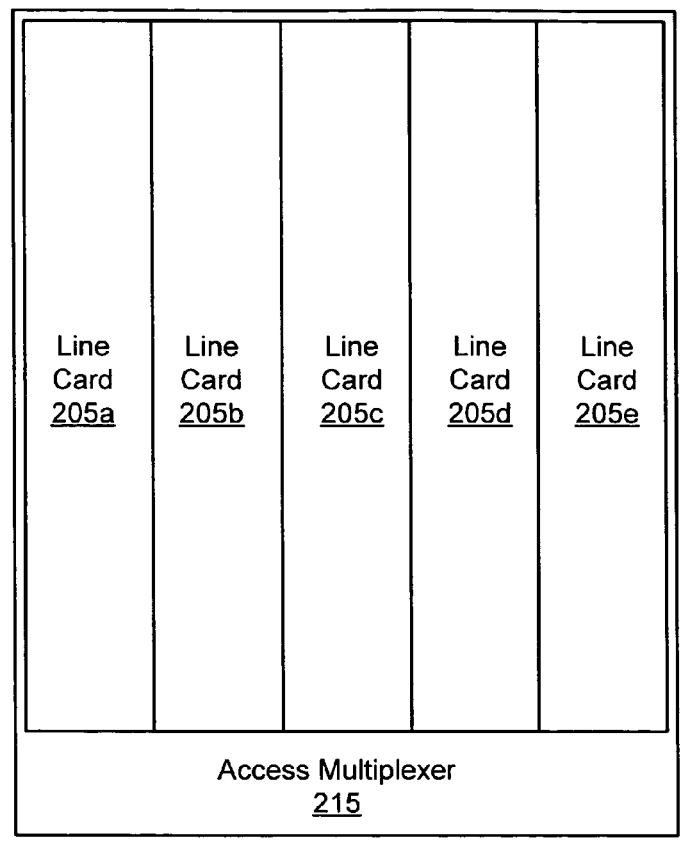
FIG. 2A is a block diagram illustrating an access multiplexer configured to provide voice-call services responsive to a dialed sequence according to some embodiments of the present invention

FIG. 2A is a block diagram illustrating elements of an access multiplexer 215 according to some embodiments of the present invention. The access multiplexer 215 may correspond to the access multiplexers 115a and/or 115b of FIG. 1.

Referring now to FIG. 2A, the access multiplexer 215 may include a chassis that links multiple customer connections at ports thereof to one or more high-speed connections. For example, the access multiplexer 215 may be a digital subscriber line access multiplexer (DSLAM). The access multiplexer 215 may be located in a central office (CO) of a telecommunications services provider. Alternatively, the access multiplexer 215 may be remotely located. The access multiplexer 215 may be configured to provide a gateway between a circuit-switched network, such as the public-switched telephone network (PSTN), and a packet-switched network, such as an Internet protocol (IP) network. As such, the access multiplexer 215 may serve as a replacement for a conventional Class-5 switch. The access multiplexer 215 may also include a plurality of line cards 205a-205e. The line cards 205a-205e may be electronic printed circuit boards configured to provide an interface between the telecommunication lines from the customer premises equipment and the PSTN and/or IP network.

Figure 2B:
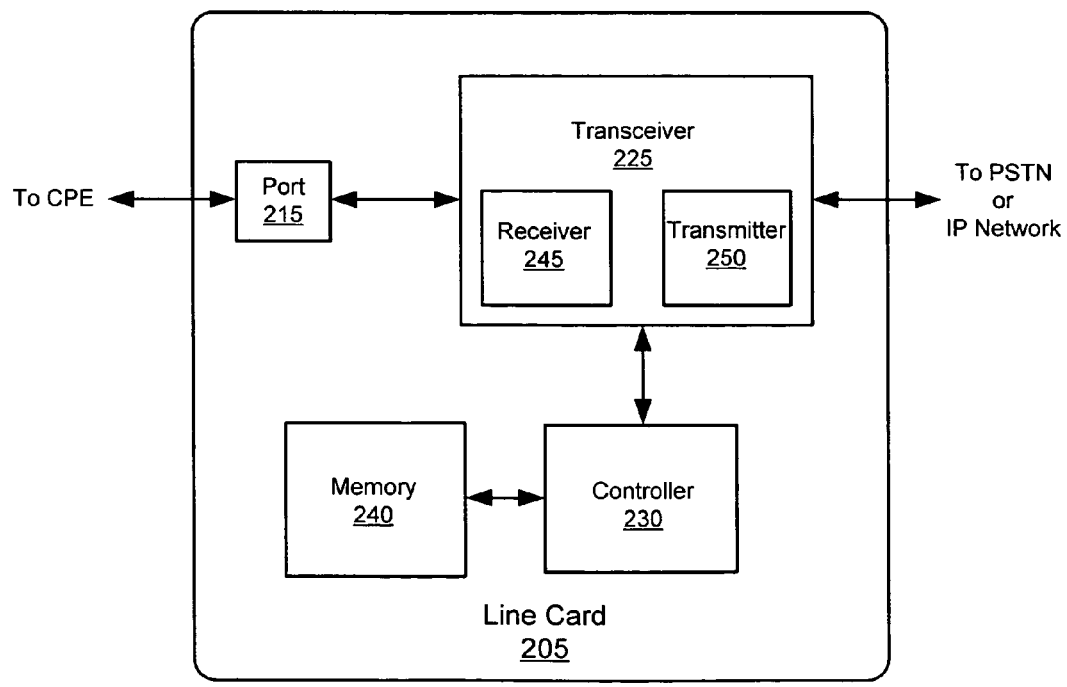
FIG. 2B is a block diagram illustrating a line card configured to provide voice-call services responsive to a dialed sequence according to some embodiments of the present invention.

FIG. 2B is a block diagram illustrating components of a line card 205 configured to provide voice-call services responsive to a dialed sequence according to some embodiments of the present invention. The line card 205 may correspond to one of the line cards 205a-205e of FIG. 2A.

Referring now to FIG. 2B, the line card 205 includes one or more ports 215, a transceiver 225, a controller 230, and a memory 240. The memory 240 may represent a hierarchy of memory that may include volatile and/or nonvolatile memory, such as removable flash, magnetic, and/or optical rewriteable nonvolatile memory. The transceiver 225 is coupled between the port 215 and a circuit-switched and/or a packet-switched network. The transceiver 225 typically includes a transmitter circuit 250 and a receiver circuit 245, which cooperate to transmit and receive signals between networks, such as the circuit-switched and packet-switched networks 120 and 125 of FIG. 1, and customer premises equipment, such as the customer premises equipment 105a and/or 105b. The controller 230 is coupled to the memory 240, the transceiver 225, and/or the port 215. The controller 230 may be, for example, a commercially available or custom microprocessor that is configured to coordinate and manage operations of the transceiver 225, the memory 240, and/or the port 215. As such, the controller 230 may be configured to provide an interface between the circuit-switched network and the packet-switched network.

The port 215 may be coupled to customer premises equipment, such as the customer premises equipment 105a and/or 105b of FIG. 1, and may have an assigned sequence associated therewith. For instance, the assigned sequence may be the telephone number associated with the customer premises equipment. As such, the assigned sequence may be a 7- or 10-digit sequence. The port 215 may be configured to receive a Dual Tone Multi-Frequency (DTMF) signal from the customer premises equipment over a circuit-switched network, for example, a public telephone network such as the PSTN. More particularly, the receiver 245 may be configured to receive the DTMF signal via the port 215.

Still referring to FIG. 2B, the controller 230 may be configured to identify a dialed sequence corresponding to the received DTMF signal, and may be further configured to recognize whether the dialed sequence is associated with a request for a specified service. The dialed sequence may be a shorter sequence than the assigned sequence associated with the port 215. For example, the dialed sequence may be *98, and the controller 230 may be configured to recognize that *98 is associated with a request for a voicemail service. Upon determining that the dialed sequence is associated with a request for a specified service, the controller 230 may be configured to populate first and second fields of a packet-switched signaling protocol message with the assigned sequence associated with the port 215. For instance, in the above example where the specified service is a voicemail service, the packet-switched signaling protocol message may be a session initiation protocol (SIP) message including an origination field and a destination field. As such, the controller 230 may be configured to populate the origination field and the destination field of the SIP message with the assigned sequence associated with the port 215. In other words, when the dialed sequence is associated with a request for voicemail service, the controller 230 may be configured to populate both the origination and destination fields with the 7- or 10-digit telephone number associated with the customer premises equipment.

The transmitter 250 may be configured to transmit the populated packet-switched signaling protocol message over a packet-switched network to request the specified service. More particularly, the transmitter 250 may be configured to transmit the populated packet-switched signaling protocol message to a server computer that is configured to provide the specified service, and the controller 230 may be configured to establish a connection between the port 215 and the server. For example, the transmitter 250 may be configured to transmit the populated packet-switched signaling protocol message to an application server, such as the application server 130a of FIG. 1. The application server may be configured to transmit a request to a media server, such as the media server 130b, that is configured to provide the specified service. As such, the controller 230 may be configured to establish a connection between the port 215 and the media server.

However, if the dialed sequence is not associated with a request for specified service, the controller 230 may be configured to populate a first field of the packet-switched signaling protocol message with the assigned sequence associated with the port 215, and populate a second field of the packet-switched signaling protocol message with the dialed sequence. For example, where the packet-switched signaling protocol message is a SIP message, the controller 230 may populate the origination field of the SIP message with the 7- or 10-digit telephone number associated with customer premises equipment coupled to the port 215, and may populate the destination field of the SIP message with the dialed sequence. As such, the controller may be configured to establish a connection between the port 215 and the port associated with the dialed sequence, as is well known in the art.

Although FIGS. 2A and 2B illustrate exemplary access multiplexers and line cards according to some embodiments of the present invention, it will be understood that the present invention is not limited to such a configuration but is intended to encompass any configuration capable of carrying out the operations described herein. For example, although the memory 240 and the controller 230 are illustrated as separate elements, the memory 240, or portions thereof may be considered as a part of the controller 230. More generally, while particular functionalities are shown in particular blocks by way of illustration, functionalities of different blocks and/or portions thereof may be combined, divided, and/or eliminated.

Figure 3:
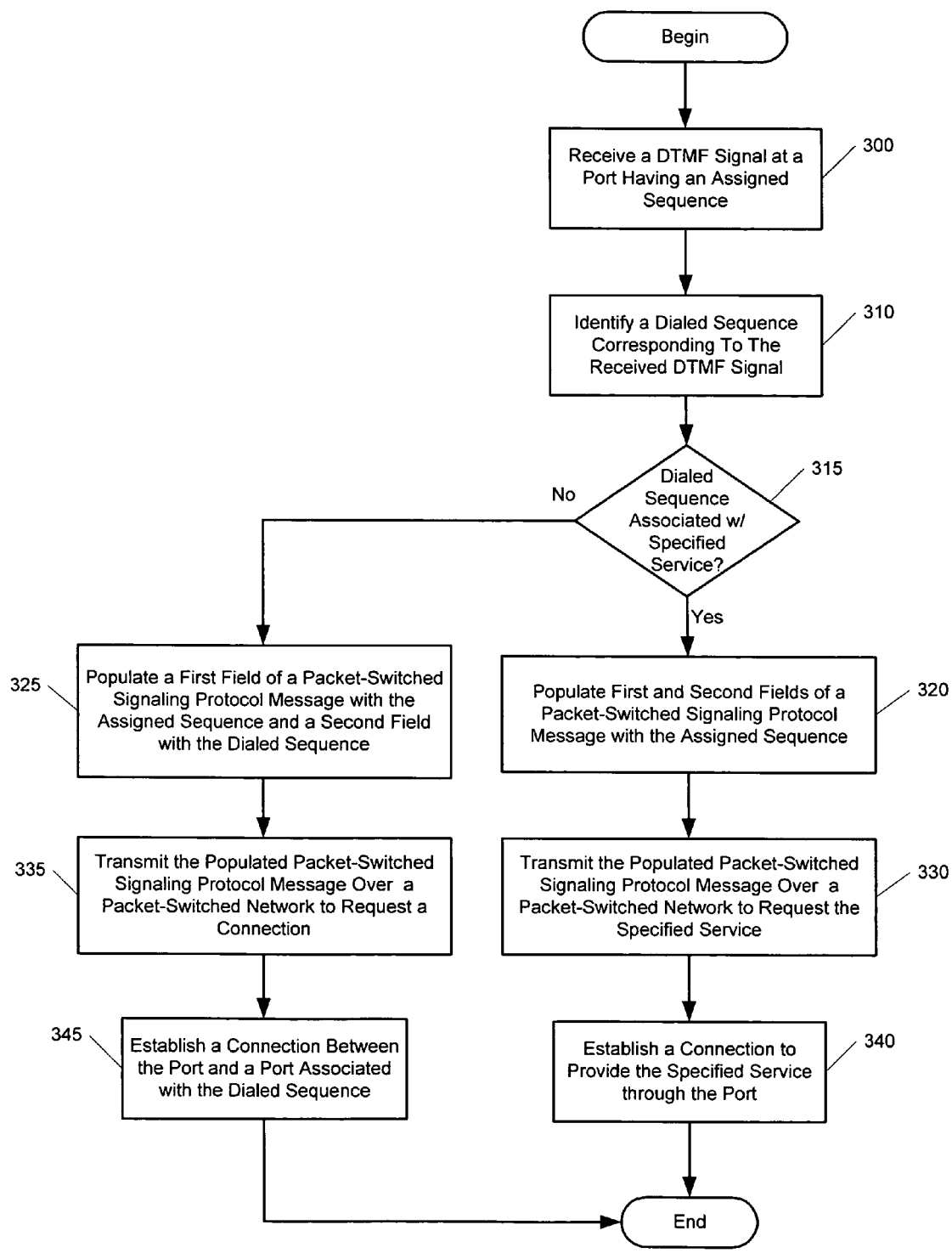
FIG. 3 is a flowchart illustrating operations for providing voice-call services responsive to a dialed sequence according to some embodiments of the present invention.

FIG. 3 is a flowchart illustrating operations for providing voice-call services responsive to a dialed sequence according to some embodiments of the present invention. For example, the operations illustrated in FIG. 3 may be performed by a PSTN/IP gateway device, such as the access multiplexer 215 of FIG. 2A. The operations illustrated in FIG. 3 may also be performed by other edge devices, for example, FITL (Fiber-In-The-Loop), NGDLC (Next Generation Digital Loop Carrier), TR008 Gateway, GR303 Gateway, and/or other gateway devices.

Referring now to FIG. 3 operations begin (Block 300) when a Dual-Tone Multi-Frequency (DTMF) signal is received at a port having an assigned sequence associated therewith. For example, the assigned sequence may be a telephone number that identifies the customer premises equipment connected to the port. A dialed sequence corresponding to the received DTMF signal is then identified (Block 310), and it is determined whether the dialed sequence is associated with a specified service (Block 315). For example, the dialed sequence may be a two or three-digit sequence associated with a voice-call service provided by the service provider, while the assigned sequence may be a 7 to 10-digit telephone number identifying customer premises equipment connected to the port. As such, the dialed sequence may be a shorter sequence than the assigned sequence associated with the port. Alternatively, the dialed sequence may be a 7- to 10-digit sequence identifying customer premises equipment to be called.

Still referring to FIG. 3, if the dialed sequence is associated with a request for a specified service (Block 315), first and second fields of a packet-switched signaling protocol message are populated with the assigned sequence associated with the port. For example, the specified service may be a voicemail service, and the packet-switched signaling protocol message may be a session initiation protocol (SIP) message including an origination field and a destination field. As such, both the origination field and the destination field of the SIP message may be populated with the assigned sequence (Block 320). The populated packet-switched signaling protocol message is transmitted over a packet-switched network to request the specified service (Block 330), and a connection is established to provide the specified service through the port (Block 340). For example, the populated packet-switched signaling protocol message may be transmitted to a server computer configured to provide the specified service, and a connection may be established between the port and the server to provide the specified service. More particularly, the populated packet-switched signaling protocol message may be transmitted to an application server, such as the application server 130a of FIG. 1. The application server may be configured to transmit a request to a media server, such as the media server 130b of FIG. 1, that is configured to provide the specified service. As such, a connection may be established between the port and the feature server to provide the specified service.

However, if the dialed sequence is not associated with a request for a specified service (Block 315), the first field of the packet-switched signaling protocol message is populated with the assigned sequence, while the second field of the packet-switched signaling protocol message is populated with the dialed sequence (Block 325). For example, if the dialed sequence is not associated with a specified service, the dialed sequence may also be a 7 to 10-digit telephone number identifying other customer premises equipment. As such, where the packet-switched signaling protocol message is a SIP message, the origination field may be populated with the assigned sequence (i.e., the telephone number associated with the customer premises equipment coupled to the port 215), while the destination field may be populated with the dialed sequence (i.e., the telephone number associated with the other customer premises equipment). Accordingly, the populated packet-switched signaling protocol message is transmitted over a packet-switched network (Block 335) to request a connection, and a connection is established between the port and a port associated with the dialed sequence (Block 345), as is well known, for example, in conventional voice-over-IP (VoIP) systems.

Figure 4:
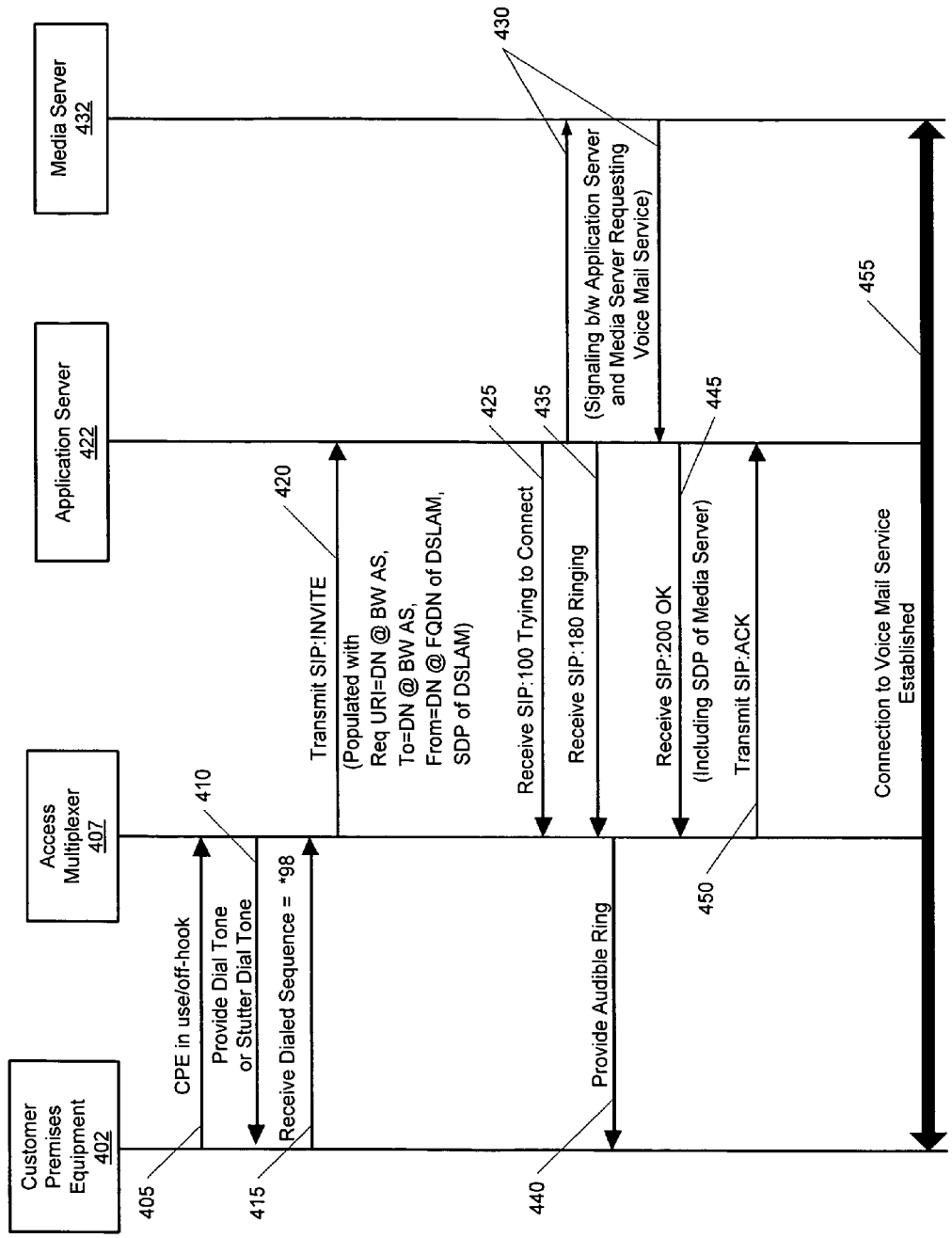
FIG. 4 is a flow diagram illustrating operations for establishing a connection between customer premises equipment and a feature server configured to provide voice-call services responsive to a dialed sequence according to some embodiments of the present invention.

FIG. 4 is a flow diagram illustrating systems and methods for providing voice-call services responsive to a dialed sequence in accordance with further embodiments of the present invention.

Referring now to FIG. 4, when a customer accesses a telephone or other customer premises equipment 402, a signal indicating that the telephone/customer premises equipment 402 is in use is transmitted to the access multiplexer 407 or other PSTN/IP gateway device (Step 405). For example, the access multiplexer 407 may be a digital subscriber line access multiplexer (DSLAM). Other examples of PSTN/IP gateway devices may include FITL (Fiber-In-The-Loop), NGDLC (Next Generation Digital Loop Carrier), TR008 Gateway, and/or GR303 Gateway devices. Upon receipt of the signal from the customer premises equipment 402, the access multiplexer 407 provides a dial tone or stutter dial tone (Step 410), indicating the presence of voicemail. Noticing that he has voicemail upon hearing the stutter dial tone, the customer dials *98 using customer premises equipment 402, and a Dual-Tone Multi-Frequency (DTMF) signal corresponding to *98 is transmitted to the access multiplexer 407. The access multiplexer 407 receives the DTMF signal at a port thereof (Step 415), and identifies the dialed sequence as *98. The access multiplexer 407 also recognizes that *98 is associated with a request for a voicemail service. As such, the access multiplexer 407 associates a different sequence with the identified dialed sequence.

More particularly, since the dialed sequence is associated with voicemail service, the access multiplexer 407 associates the dialed sequence with the 7 to 10-digit telephone number assigned to the port from which the dialed sequence was received. The access multiplexer 407 then populates the origination and destination fields of a Session Initiation Protocol (SIP) message with the telephone number assigned to the port (identified as "DN" in FIG. 4). As shown in FIG. 4, the SIP message may also include a Uniform Resource Identifier (URI), vendor data (BW), server data (AS), the fully quantified domain name (FQDN) of the access multiplexer 407, and/or the session definition protocol (SDP) for the access multiplexer 407. The populated SIP message is then transmitted from the access multiplexer 407 to an application server 422 or other feature server (Step 420).

The application server 422 may be a server computer that is configured to provide an interface between the access multiplexer 407 or other PSTN/IP gateway device and the server computer that is configured to provide the specified service. As such, the access multiplexer 407 receives a SIP message from the application server 422 indicating that it is trying to connect (Step 425). At this time, the application server 422 signals the media server 432 to request voicemail service (Step 430). The media server 432 may be, for example, a VoIP feature server that is configured to provide voicemail service for the customer premises equipment 402. The signaling between the application server 422 and the media server 432 can be a SIP message and/or a proprietary signaling protocol. The access multiplexer 407 receives a SIP message from the application server 422 indicating ringing (Step 435), and in response, the access multiplexer 407 provides an audible ring to the customer premises equipment 402 (Step 440).

Eventually, the access multiplexer 407 receives a SIP message from the application server 422 indicating approval of the request (Step 445). The SIP message may also include the SDP for the media server 432. The access multiplexer 407 then transmits a SIP message to the application server 422 acknowledging the approval (Step 450), and a connection to voicemail service between the customer premises equipment 402 and the media server 432 is established (Step 455).

Thus, according to some embodiments of the present invention, a specified service (for example, a voicemail service) may be provided through a port based on a dialed sequence received at the port. More particularly, first and second fields of a packet-switched signaling protocol message may be populated with a sequence associated with a port if the dialed sequence is associated with a request for the specified service. For example, if the dialed sequence is associated with a request for voicemail service, the origination and destination fields of a SIP message may be populated with a telephone number associated with the port, and the SIP message may be transmitted to a VoIP feature server configured to provide the voicemail service. As such, customers can continue to dial *98 to access voicemail services even where a conventional Class-5 switch at a PSTN/IP gateway has been replaced with an access multiplexer, since the SIP message requesting voicemail service may be populated at the gateway. Accordingly, existing wireline customers may be migrated from Class-5 switches to access multiplexer/VoIP architectures with little or no impact on their existing services. Moreover, customers may be prevented from re-provisioning the *98 code to another functionality.

In the drawings and specification, there have been disclosed exemplary embodiments of the invention. However, many variations and modifications can be made to these embodiments without substantially departing from the principles of the present invention. All such variations and modifications are intended to be included herein within the scope of the present invention, as set forth in the following claims.

That which is claimed:

1. A method of establishing a connection in a communications network, the method comprising:
  receiving a Dual Tone Multi-Frequency (DTMF) signal at a port, the port having an assigned numerical sequence associated therewith;
  identifying a dialed sequence corresponding to the received DTMF signal, wherein the dialed sequence is associated with a request for a specified service;
  in response to identifying the dialed sequence as associated with the request for the specified service, populating a first field of a packet-switched signaling protocol message with the assigned numerical sequence and populating a different second field of the packet-switched signaling protocol message with the assigned numerical sequence, wherein each of the first and second fields of the packet-switched signaling protocol message are populated with the same assigned numerical sequence associated with the port at which the DTMF signal is received;
  transmitting the populated packet-switched signaling protocol message over a packet-switched network to request the specified service; and
  establishing a connection to provide the specified service through the port.

2. The method of claim 1, wherein the dialed sequence is a shorter sequence than the assigned numerical sequence associated with the port.

3. The method of claim 1, further comprising:
  populating the first field with the assigned numerical sequence and populating the second field with the dialed sequence in response to identifying the dialed sequence as not associated with a request for a specified service.

4. The method of claim 1, wherein the first field comprises an origination field and wherein the second field comprises a destination field.

5. The method of claim 4, wherein the packet-switched signaling protocol message comprises a Session Initiation Protocol (SIP) message, and wherein the specified service comprises a voicemail service.

6. The method of claim 1, wherein identifying a dialed sequence and populating first and second fields of a packet-switched signaling protocol message comprises identifying the dialed sequence and populating the first and second fields of the packet-switched signaling protocol message at a Public-Switched Telephone Network (PSTN)/Internet Protocol (IP) gateway device.

7. The method of claim 6, wherein the PSTN/IP gateway device comprises a Digital Subscriber Line Access Multiplexer (DSLAM).

8. The method of claim 1, wherein transmitting the populated packet-switched signaling protocol message comprises transmitting the populated packet-switched signaling protocol message to a server configured to provide the specified service, and wherein establishing a connection comprises establishing a connection between the port and the server.

9. The method of claim 1, wherein transmitting the populated packet-switched signaling protocol message comprises transmitting the populated packet-switched signaling protocol message to an application server, wherein the application server is configured to transmit a request to a media server configured to provide the specified service, and wherein establishing a connection comprises establishing a connection between the port and the media server.

10. A computer program product for establishing a connection in a communications network, the computer program product comprising a computer readable storage medium having computer readable program code embodied therein configured to carry out the method of claim 1.

11. A network access device, comprising:
  a port having an assigned numerical sequence associated therewith and operable to receive a Dual Tone Multi-Frequency (DTMF) signal;
  a controller operable to identify a dialed sequence corresponding to the received DTMF signal, populate a first field of a packet-switched signaling protocol message with the assigned numerical sequence, and populate a different second field of the packet-switched signaling protocol message with the assigned numerical sequence, wherein each of the first and second fields of the packet-switched signaling protocol message are populated with the same assigned numerical sequence associated with the port at which the DTMF signal is received in response to identification of the dialed sequence as associated with a request for a specified service; and a transmitter operable to transmit the populated packet-switched signaling protocol message over a packet-switched network to request the specified service.

12. The network access device of claim 11, wherein the dialed sequence is a shorter sequence than the assigned numerical sequence associated with the port.

13. The network access device of claim 11, wherein the controller is further operable to populate the first field with the assigned numerical sequence and populate the second field with the dialed sequence in response to identification of the dialed sequence as not associated with the request for the specified service.

14. The network access device of claim 11, wherein the controller is operable to populate each of an origination field and a destination field of the packet-switched signaling protocol message with the assigned numerical sequence associated with the port.

15. The network access device of claim 14, wherein the packet-switched signaling protocol message comprises a Session Initiation Protocol (SIP) message, and wherein the specified service comprises a voicemail service.

16. The network access device of claim 11, wherein the port is operable to receive the DTMF signal over a public telephone network, and wherein the controller is operable to provide an interface between the public telephone network and the packet-switched network.

17. The network access device of claim 16, wherein the network access device comprises a Digital Subscriber Line Access Multiplexer (DSLAM) operable to provide a Public-Switched Telephone Network (PSTN)/Internet Protocol (IP) gateway.

18. The network access device of claim 11, wherein the transmitter is operable to transmit the populated packet-switched signaling protocol message to a server operable to provide the specified service, and wherein the controller is operable to establish a connection between the port and the server.

19. The network access device of claim 11, wherein the transmitter is operable to transmit the populated packet-switched signaling protocol message to an application server, wherein the application server is operable to transmit a request to a media server operable to provide the specified service, and wherein the controller is operable to establish a connection between the port and the media server.

* * * * *